United States Patent [19]
Parkerson et al.

[11] Patent Number: 5,742,671
[45] Date of Patent: Apr. 21, 1998

[54] SELF-ADJUSTING TELEPHONE LINE STATUS DETECTION INDICATION

[75] Inventors: Walter E. Parkerson, Fayetteville, Ark.; Roger D. Forrester, Garland, Tex.

[73] Assignee: Tandy Corporation

[21] Appl. No.: 964,751

[22] Filed: Oct. 22, 1992

[51] Int. Cl.⁶ .............................. H04M 1/24; H04M 3/22; H04M 1/00
[52] U.S. Cl. .................... 379/156; 379/1; 379/32
[58] Field of Search .................... 379/156, 164, 379/165, 166, 105, 106, 107, 5; 374/1, 7, 32, 34, 377, 382

[56] References Cited

U.S. PATENT DOCUMENTS

| | | | |
|---|---|---|---|
| 4,259,548 | 3/1981 | Fahey | 379/38 |
| 4,304,970 | 12/1981 | Fahey | 379/377 |
| 4,429,185 | 1/1984 | Adrian | 379/377 |
| 4,677,662 | 6/1987 | Lott | 376/156 |
| 4,734,933 | 3/1988 | Barsellotti | 379/164 |
| 4,760,592 | 7/1988 | Hensley | 379/7 |
| 4,802,207 | 1/1989 | Uchida | 379/164 |
| 4,803,718 | 2/1989 | Neil et al. | 379/164 |
| 4,817,132 | 3/1989 | Chamberlin | 379/165 |
| 4,939,765 | 7/1990 | Benjamin | 379/34 |
| 4,958,371 | 9/1990 | Damoci | 379/107 |
| 5,042,065 | 8/1991 | Kim | 379/165 |
| 5,187,705 | 2/1993 | Mano | 379/5 |

*Primary Examiner*—Curtis Kuntz
*Assistant Examiner*—Vijay Shankar
*Attorney, Agent, or Firm*—John F. McGowan; William A. Linnell

[57] ABSTRACT

In a multi-line telephone system, an improved method is provided for automatically detecting and indicating the status of each of a plurality of telephone lines despite variations in battery voltages on the line or lines and without requiring any adjustments by the user. Each of the lines in a system can be polled sequentially or individually as desired. The improved method measures the present voltage level associated with the selected line, distinguishes the condition of on-or-off hook or on-hold from other possible states, compares and processes the present measured voltage level in a state matrix, and updates the status indication of the selected telephone line accordingly. Status conditions which are detected and indicated by this method include on-hook, off-hook, and on-hold.

24 Claims, 2 Drawing Sheets

SELF-ADJUSTING TELEPHONE LINE STATUS DETECTION INDICATION

BACKGROUND OF THE INVENTION

This invention relates to telephones, but more particularly the invention relates to multi-line telephones and concerns an improved circuit for telephone line status detection and indication.

BACKGROUND DISCUSSION

Single or multi-line telephone equipment requires telephone line status detection and indication circuitry to correctly indicate the status of the telephone line(s). This is true for both single and multi-line as well as corded and cordless telephone equipment.

For example, the user of a multiline telephone system wants to know whether another of the lines in the system is either on hold, which may indicate another caller is waiting on that line, or whether the line is off hook, indicating that the line is in current use. In conventional systems, the indication that another line is on hold is conventionally indicated by a flashing signal, which may be a light, or a pulsating liquid crystal display. An indication that another line is in use may be through a steady light or multi-line liquid crystal display.

It is important, particularly in business operations, that the status of a line be indicated properly. For example, if a caller is on hold on another line, the telephone user will want to know that the caller is waiting for the user to pick up the line. A steady light displayed on the telephone set body (indicating the line is off hook and in use) when the caller is really waiting on the other line would be unacceptable for many business and home users.

The reason why such problems occur is that different voltages in the telephone line may indicate a different status of the line. For example, a certain voltage level may be designed into the telephone set as being indicative that a line is off hook and thus in use. However, if the voltage coming into the phone line is not matched to the designed-in voltage level, erroneous indications may occur. While the nominal voltage as it leaves the telephone company may be a certain predetermined level, the level of that voltage at the user's site will be determined by many factors, including the distance of the site from the telephone exchange, as well as the number and type of telephones which are at the user's site.

Thus, it has been necessary in the prior art to provide for some type of adjustment to correct or compensate for the incoming and internal line level differences. While most telephone sets come from the factory "preset" to affiliate a certain predetermined voltage with, for example, the existence of an on hold condition on one of the lines, in reality that predetermined voltage may be completely inaccurate with respect to the actual line voltage levels.

The terms telephone line status "detection" and "indication" are well known in the art. Simply viewed, the telephone set circuitry must first detect the level of the voltage and then, based on the detection of the level, provide an indication of the status of the line, that is, whether the line is on hold, for example. In some prior art telephones, one or more adjustable potentiometers are included in each of the phone lines in the system. The potentiometers provide a method by which the user can correct the voltage levels of the line status detection and indication circuit for proper operation by adjusting the potentiometer(s). The adjustment by way of potentiometer is necessary due to variances in voltage between phone lines and telephone equipment attached to the phone line.

In use, the telephone user must attempt to adjust the potentiometer to a level such that proper status will be indicated. A problem associated with the prior art telephone apparatus is that many telephone users are technically uneducated and cannot perform the complex line status adjustment properly. This is particularly a problem where two potentiometers are required for each line, one for the off hook level determination and the other for the on hold level determination. The adjustment is a trial and error adjustment in which the potentiometers are adjusted to determine if the adjustment level is correct. If not, the potentiometer is once again adjusted until the status indicated is correct for the actual line condition. Since the prior art line status circuits and adjustment potentiometer, two of which are required for each telephone line, this adds cost, complexity, and requires additional space within the products in which they are used.

Furthermore, line status circuits are not entirely reliable and may give incorrect indications under certain conditions. Finally, additional switches may be required to disable the phone line status indication on multi-line telephone systems for those phone lines which are not being used. This adds to the complexity of construction and increases the cost of the resulting overall telephone line system.

Therefore, it would be desirable to provide a telephone line status detection and indication system and circuit which substantially eliminates the requirement of individual users having to make detection and status adjustments in the telephone line. Furthermore, it would be desirable to provide an automatic telephone line detection and line status device in which a reduced number of parts having greater reliability is provided for.

Therefore, it is an object of the present invention to provide an improved telephone line status detection and indication circuit.

It is another object of the present invention to provide a telephone line status detection or indication circuit which is controlled by a programmed microcomputer or microprocessor.

It is a further object of the present invention to provide a telephone line status detection or indication circuit which reduces the number of parts required to achieve the desired results by reducing cost, complexity and size of products into which such circuits are incorporated.

SUMMARY OF THE INVENTION

The present invention provides a method and apparatus to automatically determine the telephone line status of one or more phone lines through the use of digital control comprising electronic circuitry combined with a microcomputer operating under a specially designed software program.

In a multiple line telephone system, for example, the microcomputer will control the selection of a particular phone line whose status is to be detected and then indicated. The microcomputer will include an analog-to-digital converter for converting measurements of phone line voltages to digital information which can be processed by the microcomputer. The microcomputer will also control the output of status indication for each phone line which is selected and tested. Thus, with the automatic phone line status detection of the present invention, the microcomputer can poll sequentially or as desired each of the telephone lines to determine its line status. With the use of digital techniques and a microcomputer under software control, the number of parts

DETAILED DESCRIPTION OF THE INVENTION

Figure 1:
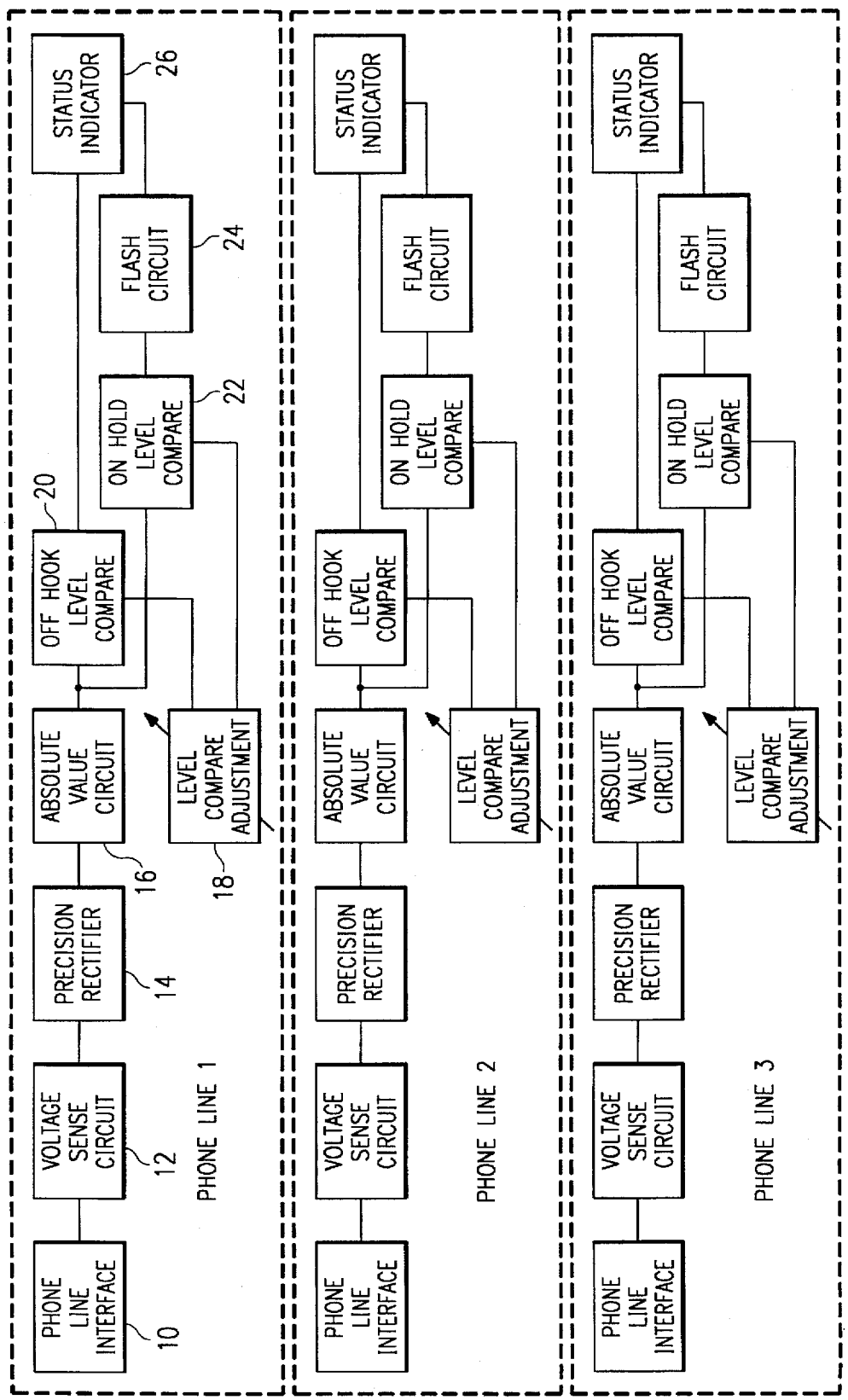
FIG. 1 shows a schematic diagram of a prior art line status detection apparatus.

FIG. 1 illustrates the operation of a line status detection and indication circuit of the prior art. As mentioned earlier, prior art devices require that there be one circuit included to correct each of the phone lines thus requiring one or more potentiometers for each of the phone lines within the user's telephone system.

Turning attention now to FIG. 1, and particularly that part of FIG. 1 that relates to phone line 1, it can be seen that FIG. 1 illustrates the line status detection mechanism for a single phone line. The interface 10 connects the telephone with the phone line interface. As mentioned earlier, the line voltage may vary considerably when received by the user's telephone set. Connected to the phone line interface is a voltage sense circuit 12 which acts as a filter to cap off or limit the line voltage which exceeds a predetermined level.

Connected to the voltage sense circuit 12 is a precision rectifier circuit 14 which detects and holds the peak value of the line voltage from the phone line interface 10. Connected to the precision rectifier is an absolute value circuit 16. Absolute value circuit 16 is a circuit well known in the art which performs the function of taking the voltage from precision rectifier 14 (which is in the form of pulsating DC voltage) and giving an output voltage which is proportional to the absolute value of the pulsed DC voltage. In combination, circuits 12, 14 and 16 act to produce an indication of the average value of the line voltage.

Connected in parallel to the output of the absolute value circuit is an off hook level compare circuit 20, and on hold level compare circuit 22. The purpose of each of these well known circuits is to compare the voltage level of the phone line in both an off hook and an on hold positioning or lines within the user's telephone system. Generally, at the phone line interface the incoming voltages, 48 volts DC, the voltage drops from 48 volts to between 3 and 8 volts DC when the telephone is in the off hook position. When the line of the telephone is in an on hold position, the voltage drop is somewhere between 48 and 3 volts, usually in the vicinity of just below 24 volts. It should be understood, however, that the values just given are merely exemplary and in actual use the values may vary greatly from the given values.

The level compare adjustment circuit 18 includes two potentiometers, one each for adjusting off hook and on hold detection and indication. The potentiometers allow the user to correct the line status detection or indication for proper operation. As mentioned earlier, a particular consumer user is not trained to properly adjust a potentiometer in the telephone system and this may result in improper indications that a telephone is off hook when, in fact, it is on hook or on hold. Through use of the potentiometer level compare adjustment circuit 18, the user can adjust the on hold and off hook level circuits so they properly reflect the actual status of the telephone. The flash circuit 24 performs the function of flashing a light or LED to indicate that the line is on hold. The indications of both the off hook level compare circuit 20 and the flash circuit 24 are connected to the status indicator 26, although only the on hold status indicator will flash or pulsate. Status indicator 26 may be a light or other indication which indicates to the user the status of the line, that the line is in use or is not in use. As can be seen with reference to FIG. 1, each of the plurality of telephone lines requires duplicates of this same circuit. This is because each of the lines is separate and because the voltage levels for sensing the off hook and on hold conditions may differ for each line in the user's telephone system.

Figure 2:
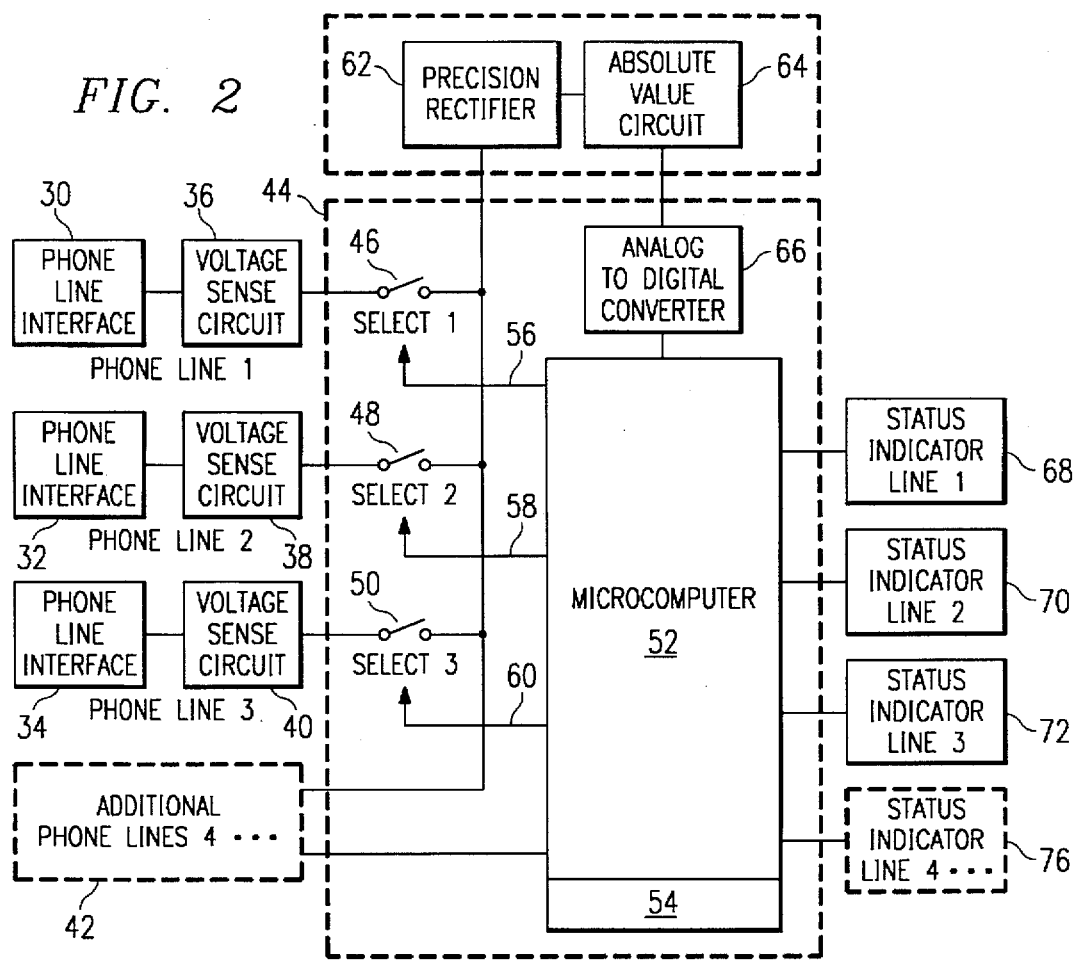
FIG. 2 illustrates a schematic diagram of a preferred embodiment of the present invention.

Turning now to FIG. 2, FIG. 2 represents a schematic diagram of the operation of the present invention control system. As in the prior art system, FIG. 2 shows a plurality of incoming phone line interfaces 30, 32 and 34. In addition, also as in the prior art phone system indicated in FIG. 1, a number of voltage filter circuits 36, 38 and 40 are connected in series with the phone line interfaces 30, 32 and 34 to filter out voltage exceeding a certain predetermined level. Additional phone lines indicated as reference number 42 may be included. Any number of additional phone lines, denoted by reference number 42, may be added to the circuit. Each of the phone lines 1, 2 and 3 of FIG. 2 are connected to a multiplexer 44. Multiplexer 44 has inputs corresponding to each of the phone lines 1, 2 and 3.

Multiplexer 44 may be configured as a discrete circuit form or may be included within an integrated circuit. In switch 44, each of phone lines 1, 2 and 3 are connected to individual or micro switches 46, 48 and 50 in the example given in which there are three phone line inputs. Obviously, if there are a number greater than three phone line inputs, the number of internal switches would correspondingly increase.

The switches 46, 48 and 50 are shown in FIG. 2 and their normal open position. In the open position shown in FIG. 2, none of the phone lines are connected to any of the other circuitry shown in FIG. 2. Each of switches 46, 48 and 50 may be individually closed in order to connect the voltage sense for a particular line to the remaining portions of the circuit of the FIG. 2. The operation of and sequencing of switches 46, 48 and 50 will be explained below.

Included within the circuit of FIG. 2 is a microcomputer or microprocessor 52. Microcomputer 52 has associated with it a program memory 54. As shown in FIG. 2, program memory 54 is internal to the microcomputer. The program memory 54 may also be external to the microcomputer as is well known to those skilled in the art. Microcomputer 52 may be a general purpose microcomputer and may be a microcomputer made by Motorola Corporation as Model No. MC68C05C8. Other suitable microcomputers or microprocessors known to those skilled in the art may be used instead of the Motorola device. Among the functions which microcomputer 52 has is the control, under the direction of software program contained in memory 54, of the operation of detecting and then indicating telephone line status. As such, microcomputer 52 is connected through a number of lines 56, 58 and 60 to the switch 44. Each of the input lines 56, 58 and 60 is connected to control switches, respectively, switches 46, 48 and 50.

Under the control of the software contained within memory 54 (which will be discussed in greater detail below), the microcomputer can selectively activate any of leads 56, 58 and 60. Actuation of leads 56, 58 and 60 causes closing of respective switches 46, 48 and 50. The actuation of the aforementioned switches may be sequential or in any other suitable order. A switch may not be actuated if, for example, the line associated with that switch is not in use or has been indicated. It is preferred, however, that, except perhaps for a dead line, that the switches be actuated on a regular sequential basis at a rapid rate, such as every 15 milliseconds.

When switches 46, 48 and 50 are closed by being activated by microcomputer control 52 operating in accordance with the program 54, phone line 1 will be connected through switch 44 to the precision rectifier 62. The precision rectifier 62 is connected in series with absolute value circuit 64. Absolute value circuit 64 and precision rectifier 62 operate in the same manner and for the same purposes(s) as their corresponding devices 14 and 16 described above with respect to the prior art embodiment of FIG. 1. The signal of a voltage value which is exiting from the absolute value circuit 64 is, of course, an analog signal which cannot be interpreted by the microcomputer 52 which requires a digital input.

Therefore, analog-to-digital converter 66 is incorporated which converts the analog level of the voltage into a digital form which the microcomputer can understand. The microcomputer 52 then will receive the voltage value (in this example for phone line 1) and produce an output after a series of calculations (to be explained in greater detail below) to status indicator line 1. In a similar fashion, the microcomputer can pull phone line 2 and phone line 3 through selection of switches 48 and 50. The output of the microcomputer 52 with respect to phone line interface 30 and phone line 1 is indicated in status line indicator 68. Status line indicators 70 and 72 correspond to phone lines 2 and 3. Obviously, a larger number of phone lines will require a greater number of status indicators as denoted by the reference numeral 74.

Figure 3:
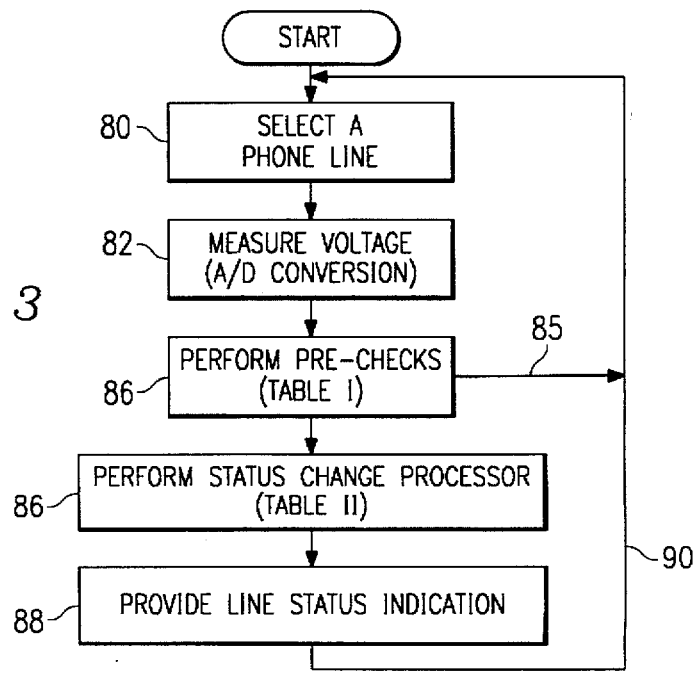
FIG. 3 is a flow chart which illustrates the operation of the software controlling the operation of the device illustrated in FIG. 2.

Turning now to FIG. 3, FIG. 3 is a flow diagram illustrating the operation of the microcomputer under software control contained within the present invention. In a first step 80, the microcomputer will select or poll one of the phone lines whose status is to be detected and then indicated. In step 82, after the phone line has been selected and measured as explained with reference to FIG. 2, conversion from an analog to a digital form prior to providing a line status indication, a number of checks are made of the level of the voltage as with respect to the phone lines selected. In step 84 the microprocessor, under control of the software contained within the memory 54, will perform a number of functions on the value of the voltage which has been measured in step 82.

Turning now to STATE Table 1, shown immediately below, the microprocessor of the controller software within the program will perform a series of tests on the voltage which has been sensed coming from the selected line. The first condition detected is whether the local rotary dialing or local hook switch flash is active. If the results are true then no further tests or status update is required and the status and the program will then loop back to start in step 85. If the ring detection is active, once again loop back to the start position.

In the next test, it will be determined whether the voltage transition flag is set. If the flag is set, the program will step to the next step 86. If the new voltage is greater than the on hook voltage, then the on hook voltage will be set to the new voltage. The next step will determine whether the transition timer is on. If the transition timer is on, the reference voltage will be set to the new voltage. The last test is to determine whether the condition change flag has been set. If the new voltage is equal to the old voltage, then no further test or status updates are required and the program will loop back to the start. If the new voltage is greater than the old voltage, or the new voltage is less than the old voltage, then the old voltage will be set to the new voltage, the condition change flag will be cleared and the program will loop to the start.

STATE TABLE I

Pre-Check Phone Line Status for Special Conditions

| TEST or CONDITION | RESULT | ACTION |
| --- | --- | --- |
| Local Rotary Dialing or Local Hook Switch Flash Active | True | No further tests or status update |
| Ring Detection Active | True | No further tests or status update |
| Voltage Transition Flag Set | True | No further tests or status update |
| New Voltage On-Hook Voltage | True | On-Hook Voltage = New Voltage |
| Transition Tiser On | True | Reference Voltage = New Voltage |
| Condition Change Flag Set | True | 1. If New Voltage = Old Voltage then: No further tests or status update. 2. If New Voltage > Old Voltage or New Voltage < Old Voltage then: A. Old Voltage = New Voltage. B. Condition Change Flag Clear. C. No further tests or status update. |

Prior to, or at least concurrent with the operation of step 84, it is necessary to initialize the remote condition status indication. By remote is meant the status of the other equipment on the same phone line. It should be noted at this juncture that when the microcomputer polls each of the phone lines and senses the voltage in each of those lines, it will store the value of the voltage sensed. When, once again, the voltage of that line is sensed, the equality or lack of equality in values will affect certain steps in the programmed process of the present invention, as will be explained in greater detail below.

However, at this point the voltage stored in memory is described herein as the "old" voltage and the voltage sensed in the next polling or sensing as the "new" voltage. As each line is sensed again and again, each new voltage will become an old voltage to its succeeding sensed voltage. If the new voltage is, in the preferred embodiment, greater than 2 volts, then this indicates that the remote status indication is active. If less than 2 volts, the remote status indication is inactive. By active is meant the line is not dead. By inactive is meant the line is dead. The distinction is important because the extension phone status of a dead line is not indicated on the display.

If each of the conditions of STATE Table I has been not been looped back to start, then the program will proceed to the next step 86. The operation of the program in step 86 is described in detail with respect to STATE Table II immediately below.

STATE TABLE II

| PRESENT STATE | CONDITION | ACTION |
|---|---|---|
| Local On-Hold and Remote On-Hook | New Voltage > Old Voltage or New Voltage = Old Voltage | 1. No State change. 2. Initialize Remote Status Indication. |
| | New Voltage < Old Voltage | 1. If Local = Off-Hook then: A. State = Local Off-Hook, Remote On-Hook. B. Initialize Remote Status Indication. 2. If Local = On-Hook then: A. Release Local On-Hold. B. Condition Change Flag = Set C. State = Local On-Hook, Remote Off-Hook |
| | New Voltage > On-Hook Voltage or New Voltage = On-Hook Voltage | 1. Old Voltage = New Voltage. 2. State = Local State |
| Local Off-Hook and Remote On-Hook | New Voltage = Old Voltage | 1. No State change. 2. Initialize Remote Status Indication. |
| | New Voltage > Old Voltage | 1. If Local = On-Hold then: A. State = Local On-Hold Remote On-Hook. B. Initialize Remote Status Indication. 2. If Local = On-Hook then: State = Local On-Hook, Remote On Hook. 3. If Local = Off-Hook then: State = No change. |
| | New Voltage < Old Voltage | 1. State = Local Off-Hook, Remote Off-Hook, 2. Initialize Remote Status Indication. |
| | New Voltage > On-Hook Voltage or New Voltage = On-Hook Voltage | 1. Old Voltage = New Voltage 2. State = Local State |
| Local Off-Hook and Remote Off-Hook | New Voltage < Old Voltage | 1. State = No change, 2. Initialize Remote Status Indication. |
| | New Voltage = Old Voltage | 1. If Local = On-Hook then: State = Local On-Hook, Remote Off-Hook 2. If Local = Off-Hook then: A. State = No change. Remote On-Hook. B. Initialize Remote Status Indication. |
| | New Voltage > Old Voltage | 1. If Local = On-Hook then: State = Local On-Hook, Remote Off-Hook 2. If Local = Off-Hook then: A. State = Local Off-Hook, Remote On-Hook. B. Initialize Remote Status Indication. |
| | New Voltage > On-Hook Voltage or New Voltage = On-Hook Voltage | 1. Old Voltage = New Voltage. 2. State = Local State |
| | New Voltage > On-Hook Voltage or New Voltage = On-Hook Voltage | 1. Old Voltage = New Voltage. 2. State = Local State |
| Local On-Hook, Remote On-Hook | New Voltage < Old Voltage | 1. If Local = Off-Hook then: A. State = Local Off-Hook, Remote On-Hook. B. Initialize Remote Status Indication 2. If Local = On-Hook then: A. Transition Timer On B. State = Local On-Hook, Remote Off-Hook C. Reference Voltage = New Voltage |
| | New Voltage > On-Hook Voltage or New Voltage = On-Hook Voltage | 1. Old Voltage = New Voltage. 2. State = Local State |
| Local On-Hook and Remote On-Hold | New Voltage < Old Voltage | 1. If Local = Off-Hook then: A. State = Local Off-Hook, Remote On-Hook. B. Initialize Remote Status Indication 2. If Local = On-Hook then: State = Local On-Hook, Remote Off-Hook |
| | New Voltage > On-Hook Voltage or New Voltage = On-Hook Voltage | 1. Old Voltage = New Voltage 2. State = Local State |
| Local On-Hook and Remote Off-Hook | New Voltage < Old Voltage or New Voltage = Old Voltage | 1. If Local = Off-Hook then: A. State = Local Off-Hook, Remote Off-Hook B. Initialize Remote Status Indication 2. If Local = On-Hook then: No change. |
| | New Voltage > Old Voltage | 1. If Transition Timer = On then: A. Reference Voltage = New Voltage. B. State = no change 2. If New Voltage > Reference Voltage then: State = Local On-Hook, Remote On-Hold. 3. If New Voltage < Reference Voltage or New Voltage = Reference Voltage then: A. If Local = Off-Hook then: 1. State = Local Off-Hook, Remote Off-Hook. 2. Initialize Remote Status Indication. B. If Local = On-Hook then: no change |
| | New Voltage > On-Hook Voltage or New Voltage = On-Hook Voltage | 1. Old Voltage = New Voltage. 2. State = Local State |

STATE Table II represents the various permutations in line conditions possible with a line designated as local and a line designated as a remote line: Local On Hold with Remote On Hook; Local Off Hook with Remote On Hook; Local Off Hook and Remote Off Hook; Local On Hook with Remote On Hook; Local On Hook and Remote On Hold; and Local On Hook and Remote Off Hook.

For purposes of understanding the State Tables, the following conventions are to be understood. The term "New Voltage" means the present or most recent voltage measurement value of the phone line voltage. The term "Old Voltage" means the previous voltage measurement of the phone line. The term "Reference Voltage" means the historical voltage level for the Off Hook Status condition. The term On Hook voltage means the historical voltage level for the On Hook Status condition. The term "Remote" means the status of other equipment on the same telephone line. The term "Local" means the status of the user's phone line. The term "State" means the present computed status of the telephone line.

To best explain the operation of the present invention, an example is in order. This example will serve to explain the operation of the other permutations shown in STATE Table II. Taking as an example the condition in which the local line is off hook and the remote line is on hook, the operation of the programmed microcomputer 52 is as follows. As mentioned earlier, the level of the "old" voltage when compared to the level of the "new" voltage will give an indication of the status of the respective local and remote lines. If the microcomputer senses that the old voltage is equal to the new voltage, it then knows that there has been no indication of the status of the line (because the voltage has remained the same). In that event the remote status indication is initialized, which means that whatever was the status detected and indicated previously remains valid, and thus the indication in this example that the remote line is on hook will not be changed.

If, however, the indication from sensing of the "new" voltage compared to the "old" voltage sensed and stored in memory indicates that the new voltage is greater than the "old" voltage, then a series of questions must be determined. If the local line is on hold, then the local is on hold and the remote is on hook. A indication of this status is then communicated to the appropriate light or other display. If, however, the local is indicated as being on hook, then the local is on hook and the remote is on hook. If the local is off hook, then, because the expected status was such, the local is off hook and the status of the remote line is unchanged.

If in this same example the new voltage was in fact sensed to be less than the old voltage, then the state indicated is that the local line is off hook, as is the remote line. An indication of this is indicated by initialization of the remote status indication.

Further, in the same example, if the new voltage sensed is greater than the on hook voltage or the new voltage is equal to the on hook voltage, then the old voltage is set to the value of the new voltage and the state is equated to the state of the local line's state.

As can be appreciated by review of the remaining portions of STATE Table II, a large number of possibilities exist dependent on the level of the voltage in comparison to previous voltages and to a reference voltage. Indication of the voltages and the particular conditions prevailing (on hook, off hook, on hold) will produce a number of possibilities, as indicated by review of STATE Table II. Nevertheless, the presentation of the possible permutations illustrated in STATE Table II operates in a similar fashion as just described.

Once again returning to the flowchart of FIG. 3, after step 86 has been completed, by processing the status indication information and updating the indication of the status detected, in step 88 an indication will be given of the status of the phone line selected or polled in step 80.

Thereafter, in step 90, the process returns to the start position wherein the next phone line is selected and steps 82 through 86 performed on the new phone line selected repeated.

The present invention therefore provides an accurate, component-efficient system to detect and indicate the status of a telephone line. The system may be understood to be useful for both single and multiple line systems which are corded or cordless.

Having thus described the preferred embodiment of the present invention, it should be obvious to persons of skill in the related arts that various alterations of the invention are possible. Such obvious variations are intended to be included within the scope of the invention which is limited only by the appended claims.

What we claim is:

1. A method for automatically detecting and indicating a status of a telephone line, comprising the steps of:

measuring a present voltage level of a selected telephone line;

performing a condition pre-check upon said selected telephone line;

comparing, for the selected line, the present voltage level measured on said selected telephone line with a previously measured voltage level stored in memory; and updating the status indicated for said selected telephone line.

2. The method of claim 1, further comprising:

replacing said previously measured voltage level with said present voltage level in said memory if said present voltage level is different from said previously stored voltage level.

3. The method of claims 1 or 2, wherein the status indicated is one of: on hook, on hold, or off hook.

4. The method of claims 1 or 2 wherein the steps are performed under the control of a programmed microcomputer.

5. An apparatus for detecting and indicating a status of a telephone line comprising:

means for measuring a present voltage level of a selected telephone line;

means for performing a condition pre-check of said telephone line;

means for storing a previously measured voltage level in memory;

means for comparing, said present voltage level measured on said selected telephone line with the previously measured voltage level; and means for updating the status indicated for the telephone line.

6. The system of claim 5, further comprising means for replacing said previously measured voltage level with said present voltage level in said memory if said present voltage level is different from said previously stored voltage level.

7. The apparatus of claims 5 or 6, wherein the indicated status is one of: on hook, on hold, or off hook.

8. The apparatus of claims 5 or 6 wherein at least one or more of the means for measuring, means for performing a condition precheck, means for comparing, means for processing, or means for updating are controlled by a programmed microcomputer.

9. A telephone line status detection and indication system, comprising:

an interface means;

a voltage sensing means;

switching means for connecting an output of the interface and voltage sensing apparatus representing a telephone line to said system;

a means for controlling said switching means wherein an output of the interface and voltage sensing apparatus is conducted to the telephone line;

means for measuring a present voltage level of the telephone line;

means for performing a condition pre-check upon the telephone line;

means for storing a previously measured voltage level;

means for comparing and processing the present voltage level and said previously measured voltage level of the telephone line; and means for indicating the status of the telephone line.

10. The system of claim 9 further comprising a means for replacing said previously stored voltage level in said means for storing a previously measured voltage level with said present voltage level if said present voltage level is different from said previously measured voltage level.

11. The system of claim 10 wherein the switching means is a multiplexer.

12. The system of claim 11 wherein the controller apparatus is a programmed microcomputer.

13. The system of claim 12 further comprising an analog to digital convertor to convert the voltage measured by the means for measuring into a digital form for use by the programmed microcomputer.

14. The system of claim 12 wherein the means for comparing and processing compares the present voltage level with the previous voltage level and wherein, under control of the programmed microcomputer, the indication of the status of the telephone line is updated dependent upon whether the previous voltage level is less than, more than or equal to the present voltage level.

15. The system of claim 14, wherein said telephone line comprises a local line and a remote line and, under the condition of the local line on hold and the remote line on hook, if the present voltage level on a selected line exceeds the previously measured voltage level on the selected line, then no change in the indicated status of the line is made.

16. The system of claim 14 wherein said telephone line comprises a local line and a remote line and, under the condition of a local line on hold and a remote line on hook, if the present voltage level is equal to the previous voltage level, then a remote status indication is activated.

17. The method of claim 1 wherein the step of performing a condition pre-check upon the telephone line comprises the steps of:

(a) testing the telephone line for the presence of voltage levels indicating conditions other than on-hook, off-hook, or on-hold; and (b) restoring operation of the condition pre-check to an initial condition if the testing step indicates a condition other than: on-hook, off-hook, or on-hold.

18. The method of claim 2 wherein the step for processing the results of step (c) further comprises the step of initializing a remote condition status indicator for a subsequent telephone line.

19. The method of claims 1 or 2 wherein the step of measuring the present voltage level further comprises the step of converting the measured voltage level to a digital form.

20. The apparatus of claim 5 wherein the means for measuring a present voltage level further comprises means for converting the measured voltage level to a digital form.

21. The system of claim 9 wherein the means for comparing and processing further comprises a state matrix for analyzing the measured voltage level comparisons.

22. The method of claim 1, wherein the condition pre-check step further comprises determining whether dialing, hook switch flashing, or ringing voltages are present on the telephone line.

23. The apparatus of claim 5, wherein the means for performing a condition pre-check upon the telephone line further comprises a state table.

24. The system of claim 9, wherein the means for performing a condition pre-check upon the telephone line further comprises a state table.

* * * * *